United States Patent
Rowell et al.

(10) Patent No.: US 10,277,341 B2
(45) Date of Patent: Apr. 30, 2019

(54) TEST SYSTEM AND METHOD FOR TESTING MULTIPLE INPUT MULTIPLE OUTPUT CAPABILITIES

(71) Applicant: Rohde & Schwarz GmbH & Co. KG, Munich (DE)

(72) Inventors: Corbett Rowell, Munich (DE); Daniel Markert, Deggendorf (DE); Hendrik Bartko, Unterhaching (DE); Adam Tankielun, Ottobrunn (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/588,093

(22) Filed: May 5, 2017

(65) Prior Publication Data

US 2018/0323888 A1 Nov. 8, 2018

(51) Int. Cl.
*H04B 3/46* (2015.01)
*H04B 17/391* (2015.01)
*H04B 7/0413* (2017.01)

(52) U.S. Cl.
CPC ....... *H04B 17/3912* (2015.01); *H04B 7/0413* (2013.01)

(58) Field of Classification Search
CPC ..... H04L 25/03044; H04L 2025/03509; H04L 2025/0349; H04L 27/01; H04L 25/0307; H04B 17/3912; H04B 7/0413; H01Q 1/362; H01Q 21/00
USPC ................................ 375/224, 316, 219, 295
See application file for complete search history.

(56) References Cited

U.S. PATENT DOCUMENTS

| | | | |
|---|---|---|---|
| 8,576,947 B2 | 11/2013 | Olgaard et al. | |
| 2014/0141727 A1* | 5/2014 | Kildal | G01R 29/0821 455/67.12 |
| 2017/0318623 A1* | 11/2017 | Duffy | H04W 36/14 |
| 2018/0034563 A1* | 2/2018 | Foegelle | H04B 17/0087 |

* cited by examiner

*Primary Examiner* — Zewdu A Kassa
(74) *Attorney, Agent, or Firm* — Ditthavong & Steiner, P.C.

(57) ABSTRACT

A test system is used for testing multiple input multiple output capabilities. The system comprises a device under test, a movable antenna and a signal simulation unit. Furthermore, the signal simulation unit simulates at least two multiple input multiple output channels in order to test the multiple input multiple output capabilities of the device under test.

18 Claims, 5 Drawing Sheets

TEST SYSTEM AND METHOD FOR TESTING MULTIPLE INPUT MULTIPLE OUTPUT CAPABILITIES

TECHNICAL FIELD

The invention relates to a test system and a method for testing multiple input multiple output capabilities especially with the aid of a single antenna being movable.

BACKGROUND ART

Generally, in times of an increasing number of wireless communication applications employing MIMO (Multiple Input Multiple Output) systems such as LTE (Long Term Evolution), there is a growing need of a testing device and a testing method for testing devices under test applying such systems.

U.S. Pat. No. 8,576,947 B2 relates to a system and a method for multiple input multiple output signal testing, and more precisely, to signal conversion circuitry and method for converting a multiple input multiple output packet data signal transmission to a plurality of complex data samples for processing by shared test equipment. Disadvantageously, in accordance with said document, a single antenna is not sufficient for testing, which makes the process of testing inefficient and costly.

Accordingly, there is a need to provide a test system and a method for testing multiple input multiple output capabilities in a most efficient manner.

SUMMARY OF THE INVENTION

According to a first aspect of the invention, a test system for testing multiple input multiple output capabilities is provided. The test system comprises a device under test, a movable antenna and a signal simulation unit. The signal simulation unit simulates at least two multiple input multiple output channels. Advantageously, a single antenna being movable is sufficient for simulating at least two multiple input multiple output channels.

According to a first preferred implementation form of the first aspect, the at least two multiple input multiple output channels are transmitted or received sequentially with the aid of the movable antenna.

According to a further preferred implementation form of the first aspect, transmitting or receiving the at least two multiple input multiple output channels is possible during movement of the movable antenna. Advantageously, a virtual antenna array is emulated with the aid of the single movable antenna.

According to a further preferred implementation form of the first aspect, the device under test is movable or rotatable or tiltable.

According to a further preferred implementation form of the first aspect, the simulation of the at least two multiple input multiple output channels with the aid of the signal simulation unit is based on sequential digitization.

According to a further preferred implementation form of the first aspect, the test system comprises at least one additional antenna being movable or not movable for transmitting or receiving. Advantageously, this allows for investigating the beamforming behaviour of the device under test.

According to a further preferred implementation form of the first aspect, the movable antenna moves in a circle around the device under test.

According to a further preferred implementation form of the first aspect, the movable antenna not completely rotates around the device under test.

According to a further preferred implementation form of the first aspect, the movable antenna moves around the device under test in the sense of a cylindrical, spherical, or spiral or helical shape or trace or a combination thereof.

According to a second aspect of the invention, a method for testing multiple input multiple output capabilities is provided. The method comprises the steps of simulating at least two multiple input multiple output channels with the aid of a signal simulation unit, and sequentially transmitting or receiving the at least two multiple input multiple output channels with the aid of a movable antenna with respect to a device under test. Advantageously, a single antenna being movable is sufficient for simulating at least two multiple input multiple output channels.

According to a first preferred implementation form of the second aspect, transmitting or receiving the at least two multiple input multiple output channels is enabled during movement of the movable antenna. Advantageously, a virtual antenna array is emulated with the aid of the single movable antenna.

According to a further preferred implementation form of the second aspect, the device under test is moved or rotated or tilted.

According to a further preferred implementation form of the second aspect, the simulation of the at least two multiple input multiple output channels with the aid of the signal simulation unit is based on sequential digitization.

According to a further preferred implementation form of the second aspect, the method involves at least one additional antenna being moved for transmitting or receiving. Advantageously, this allows for investigating the beamforming behaviour of the device under test.

According to a further preferred implementation form of the second aspect, the movable antenna is moved in a circle around the device under test.

According to a further preferred implementation form of the second aspect, the movable antenna is not completely rotated around the device under test.

According to a further preferred implementation form of the second aspect, the movable antenna is moved around the device under test in the sense of a cylindrical, spherical, or spiral shape or helix or a combination thereof.

BRIEF DESCRIPTION OF THE DRAWING

Exemplary embodiments of the invention are now further explained with respect to the drawings by way of example only, and not for limitation. In the drawings.

DETAILED DESCRIPTION OF THE PREFERRED EMBODIMENTS

Figure 1:
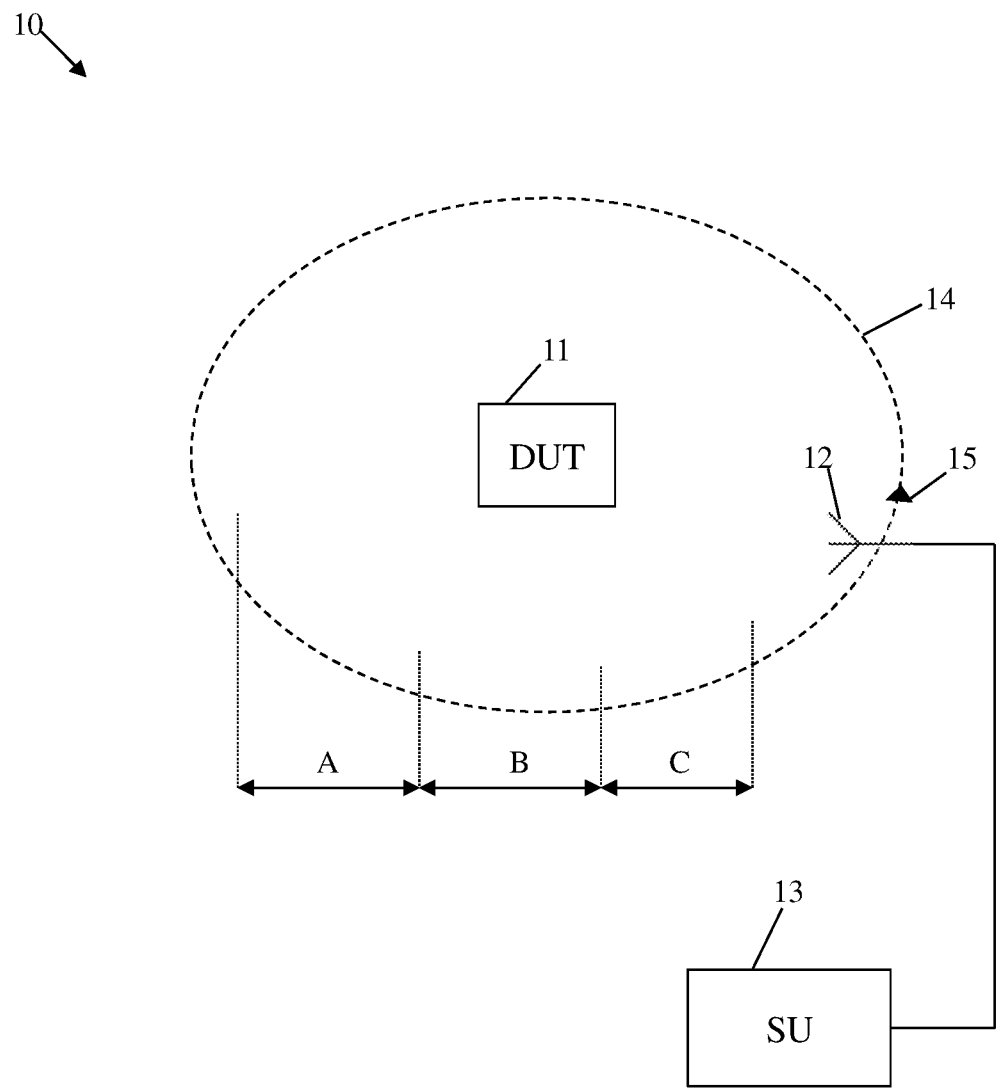
FIG. 1 shows a block diagram of an exemplary embodiment of the first aspect of the invention.

FIG. 1 illustrates an exemplary embodiment of a test system 10 for testing multiple input multiple output capabilities. The invention is not limited to this embodiment and all features below are explained for the purpose of example only.

The test system 10 comprises a device under test 11, a moveable antenna 12 and a signal simulation unit 13 connected to the movable antenna 12.

Whereas the signal simulation unit 13 is embodied to simulate at least two multiple input multiple output channels, the at least two multiple input multiple output channels are transmitted or received sequentially the aid of the movable antenna 12.

Furthermore, the movable antenna 12 is exemplarily moved around the device under test 11 according to the dashed line 14, wherein the direction of movement is illustrated by arrow 15.

As it can be seen, in this exemplary case, the movable antenna 12 moves in an ellipse around the device under test 11. In this context, it should be mentioned that the movable antenna 12 may also move in a circle around the device under test 11. Furthermore, the movable antenna 12 may move around the device under test 12 in the sense of a cylindrical, spherical, spiral, helical shape or trace or a combination thereof. Additionally or alternatively, the movable antenna 12 may not completely rotate around the device under test 11.

Moreover, the simulation of the at least two multiple input multiple output channels with the aid of the signal simulation unit is based on sequential digitization. In addition to this, as it can be seen from FIG. 1, said simulation comprises different sections, exemplarily sections A, B, and C. During movement of the movable antenna 12, the signal simulation unit 13 advantageously switches between these multiple, exemplarily three, preferably at least two, simulation sections, wherein the simulation sections especially differ in their data rate. They might also differ in the kind of modulation, length or frames, number of used MIMO antennas etc.

Figure 2:
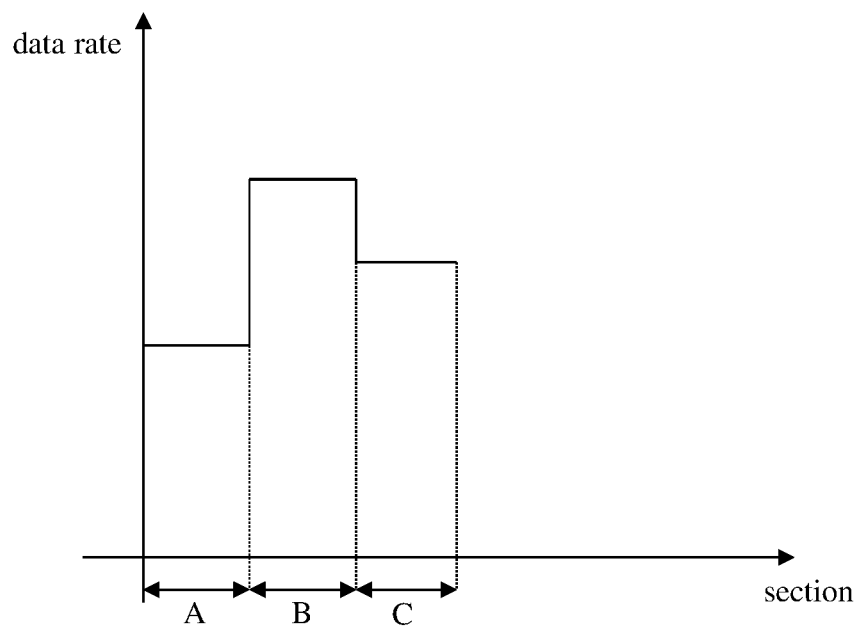
FIG. 2 shows an exemplary function process of data rate with respect to moving the movable antenna of the invention.

This situation is illustrated with the aid of the diagram according to FIG. 2, wherein the lowest data rate of section A is followed by the highest data rate of section B which is followed by an intermediate data rate of section C.

Again with respect to FIG. 1, it should be mentioned that the test system 10 may comprise at least one additional antenna being movable or not movable for transmitting or receiving. In this manner, the device under test 11 can advantageously be tested with respect to its beamforming behavior.

Figure 3:
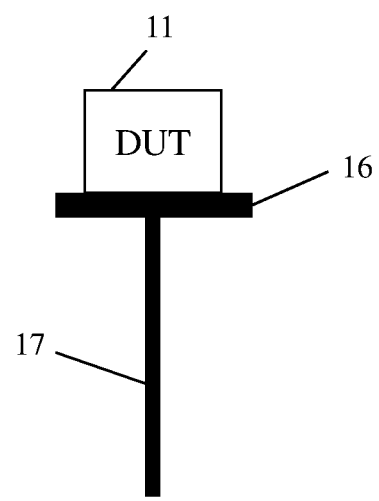
FIG. 3 shows an exemplary embodiment of a device under test mount.

Additionally or alternatively, the device under test 11 is movable or rotatable, which may exemplarily be achieved with the aid of a device under test mount according to FIG. 3.

The device under test mount for mounting the device under test 11 comprises a plane 16 being rotatable around an axis 17. Additionally or alternatively, the axis 17 may allow for height adjustment or tilting or a combination thereof.

Figure 4:
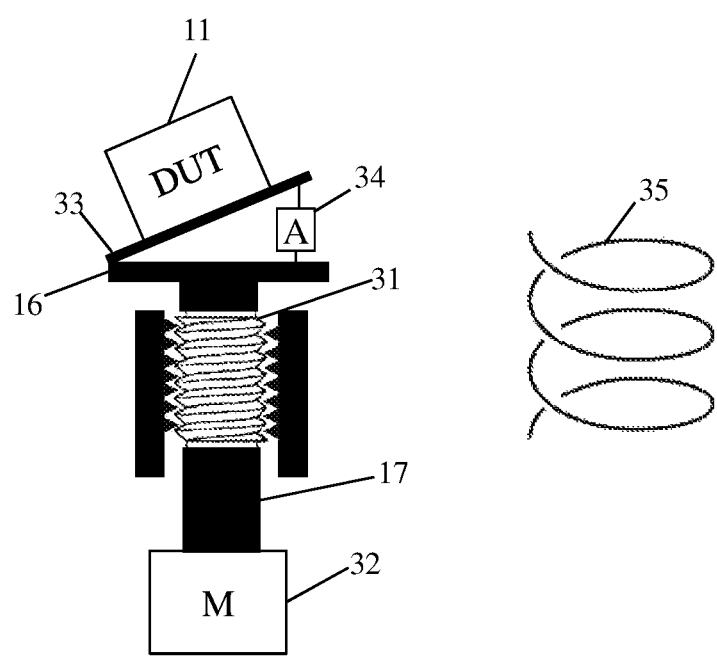
FIG. 4 shows a more detailed exemplary embodiment of a device under test mount.

In FIG. 4, an embodiment of the device under test mount is shown in greater detail. In this context, the device under test mount comprises a first plane 16 attached to a first end of an axis 17, wherein the axis 17 comprises a thread 31 for moving the plane 16 up and down with the aid of a motor 32 attached to a second end of the axis 17. As it can be seen, rotating the axis 17 with the aid of the motor 32 serves the height adjustment of the first plane 16, and thus also of the device under test 11.

Furthermore, the device under test 11 is attached to a second plane 33 which is attached to the first plane 16 in a tiltable manner. For the purpose of tilting the device under test 11, and thus for tilting the second plane 33 with respect to the first plane 16, the device under test mount comprises an actuator 34 which tilts the second plane 33 with respect to the first plane 16.

In addition to this, FIG. 4 illustrates an exemplary trace of movement of the device under test 11 in the case that the device under test 11 is moved down in a tilted condition, which leads to the helical trace 35.

Figure 5:
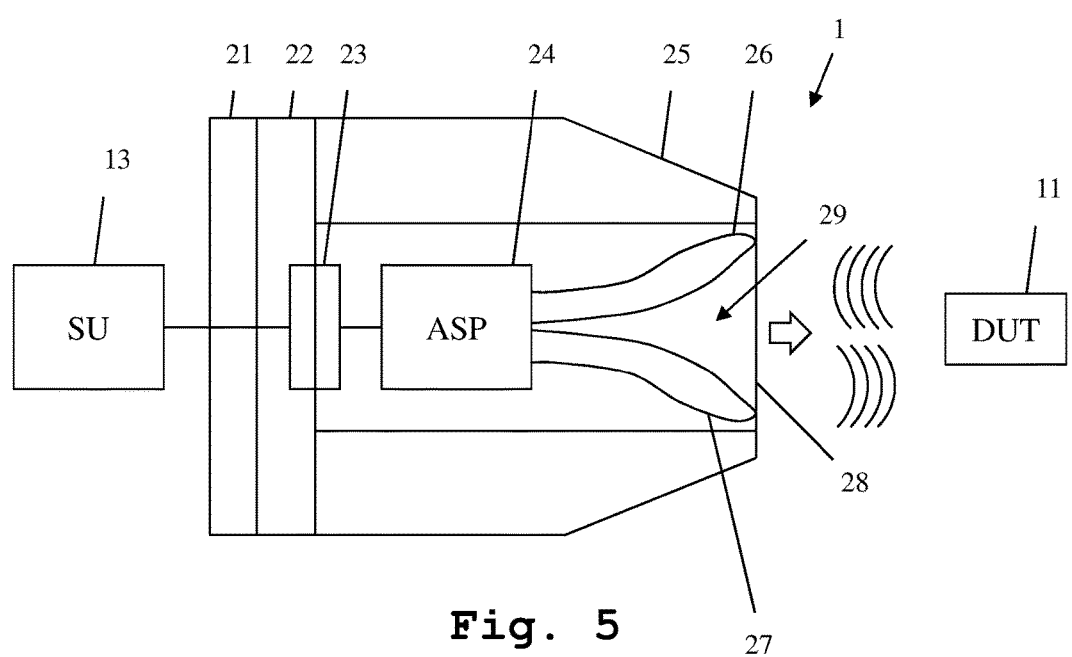
FIG. 5 shows an exemplary embodiment of a movable antenna.

Moreover, with respect to FIG. 5, an exemplary embodiment of the movable antenna 12 is shown, wherein the movable antenna 12 is embodied in the form of an over the air probe 1. Additionally or alternatively, the above-mentioned at least one additional antenna may also be embodied in accordance with FIG. 5.

In FIG. 5, the over the air probe 1 comprises a housing 25 which contains a substrate 28, advantageously a printed circuit board. On the substrate 28, two antenna elements 26, 27 forming a tapered slot line antenna 29, are arranged. The antenna 29 is connected to an analog signal processor 24 which is also arranged on the substrate 28. The analog signal processor moreover is connected to a connector 23 which serves as an interface 23. Connectable to the interface 23 is the signal simulation unit 13, which is not part of the over the air probe 1. The antenna 29 has a main radiation direction towards the right edge of the substrate 28, indicated by an arrow. The device under test 11 is suitably arranged in this direction.

In order to minimize reflections from the over the air probe 1, the housing 25 is tapered towards the main radiation direction of the antenna 29. This tapering reduces the effective surface area, which can produce reflections. In order to further reduce such reflections, the housing 25 can be fabricated from an electromagnetic radiation absorbing material. It can also be covered with such a material or can be coated with an absorptive paint. The housing 25 furthermore comprises a back plate 21, which is covered with absorptive material 22 in order to further reduce reflections.

The over the air probe 1 is suitable for two types of measurements. In a first type of measurement, a first measuring signal emitted from the device under test 11 is received by the antenna 29 and handed to the analog signal processor 24. The analog signal processor 24 reduces the frequency of the first measuring signal resulting in a frequency reduced first measuring signal. This is for example done by down-converting the first measuring signal using a mixer. Additionally, the analog signal processor in this case can comprise one or more filters for filtering the first measuring signal or the frequency reduced first measuring signal, a power sensor, which can be used for directly measuring a power of the frequency reduced first measuring signal, an amplifier for amplifying the first measuring signal or the first frequency reduced measuring signal, and a radio frequency switch for switching between different measuring options.

The processed frequency reduced measuring signal is then handed on to the connector 23, which passes on the signal to for example the external signal simulation unit 13 for further processing the frequency reduced measuring signal.

Alternatively, the over the air probe 1 can be used for another type of measurement. In this case, the connector 23 receives a frequency reduced second measuring signal from the signal simulation unit 13. It is handed on to the analog signal processor 24. The analog signal processor 24 increases the frequency of the frequency reduced second measuring signal resulting in a second measuring signal. This is for example done by mixing the frequency reduced second measuring signal with a further local oscillator signal. The second measuring signal is then transmitted by the antenna 29 to the device under test 11. Also, in this case, the analog signal processor can comprise additional components. The analog signal processor can comprise a filter, for filtering the second measuring signal and/or the second frequency reduced measuring signal. Also, the analog signal processor can comprise an amplifier for amplifying the second measuring signal and/or the second frequency reduced measuring signal. Moreover, the analog signal processor can comprise a radio frequency switch, adapted to switch between different operating modes of the over the air probe 1.

Figure 6:
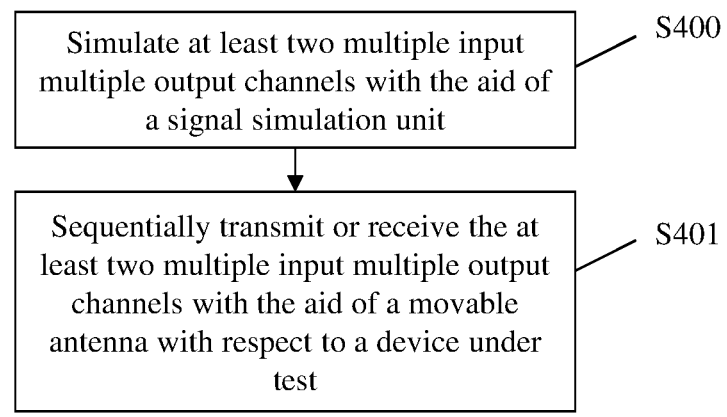
FIG. 6 shows a flow chart of an exemplary embodiment of the second aspect of the invention.

Finally, FIG. 6 shows a flow chart of an exemplary embodiment of the inventive method. In a first step S400, at least two multiple input multiple output channels are simulated with the aid of a signal simulation unit. Then, in a second step S401, the at least two multiple input multiple output channels are sequentially transmitted or received with the aid of a movable antenna with respect to a device under test.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A test system for testing multiple input multiple output capabilities, the system comprising:
   a device under test,
   a movable antenna moves around the device under test, and
   a signal simulation unit,
   wherein the signal simulation unit simulates at least two multiple input multiple output channels,
   wherein the simulation comprises different sections,
   wherein the sections differ in the kind of modulation, length or frames,
   wherein a device under test mount comprises a first plane that is rotatable around an axis, wherein the axis comprises a thread for a vertical movement of the first plane, and
   wherein a second plane is attached to the first plane in a tiltable manner.

2. The test system according to claim 1,
   wherein the at least two multiple input multiple output channels are transmitted or received sequentially with the aid of the movable antenna.

3. The test system according to claim 2,
   wherein transmitting or receiving the at least two multiple input multiple output channels is possible during movement of the movable antenna.

4. The test system according to claim 1,
   wherein the device under test is movable or rotatable or tiltable.

5. The test system according to claim 1,
   wherein the simulation of the at least two multiple input multiple output channels with the aid of the signal simulation unit is based on sequential digitization.

6. The test system according to claim 2,
   wherein the test system comprises at least one additional antenna for transmitting or receiving.

7. The test system according to claim 6,
   wherein the additional antenna is movable or rotatable or tiltable.

8. The test system according to claim 1,
   wherein the movable antenna moves in a circle around the device under test.

9. The test system according to claim 1,
   wherein the movable antenna not completely rotates around the device under test.

10. The test system according to claim 1,
    wherein the movable antenna moves around the device under test in a cylindrical or spherical or spiral or helical trace or a combination thereof.

11. A method for testing multiple input multiple output capabilities, the method comprising the steps of:
    simulating at least two multiple input multiple output channels with the aid of a signal simulation unit, and
    sequentially transmitting or receiving the at least two multiple input multiple output channels with the aid of a movable antenna with respect to a device under test,
    wherein the movable antenna moves around the device under test,
    wherein the simulation comprises different sections,
    wherein the sections differ in the kind of modulation, length or frames,
    wherein a device under test mount comprises a first plane that is rotatable around an axis, wherein the axis comprises a thread for a vertical movement of the first plane, and
    wherein a second plane is attached to the first plane in a tiltable manner.

12. The method according to claim 11,
    wherein transmitting or receiving the at least two multiple input multiple output channels is enabled during movement of the movable antenna.

13. The method according to claim 11,
    wherein the device under test is moved or rotated or tilted.

14. The method according to claim 11,
    wherein the simulation of the at least two multiple input multiple output channels with the aid of the signal simulation unit is based on sequential digitization.

15. The method according to claim 11,
    wherein the method involves at least one additional antenna being moved for transmitting or receiving.

16. The method according to claim 11,
    wherein the movable antenna is moved in a circle around the device under test.

17. The method according to claim 11,
    wherein the movable antenna is not completely rotated around the device under test.

18. The method according to claim 11,
    wherein the movable antenna is moved around the device under test in a cylindrical, spherical, or spiral or helical trace or a combination thereof.

* * * * *